United States Patent [19]
Tanaka

[11] Patent Number: 5,996,365
[45] Date of Patent: Dec. 7, 1999

[54] AIR CONDITIONING APPARATUS FOR VEHICLES WITH CONTINUOUS FLOW OF REFRIGERANT

[75] Inventor: Masaya Tanaka, Anjo, Japan

[73] Assignee: Denso Corporation, Kariya, Japan

[21] Appl. No.: 08/905,235

[22] Filed: Aug. 1, 1997

[30] Foreign Application Priority Data

Aug. 6, 1996 [JP] Japan ..................................... 8-206725
Jun. 19, 1997 [JP] Japan ..................................... 9-162200

[51] Int. Cl.⁶ ..................................................... F25B 41/00
[52] U.S. Cl. ................................. 62/196.4; 62/90; 62/160; 62/186; 62/244
[58] Field of Search ........................... 62/239, 244, 324.6, 62/186, 159, 160, 90, 93, 196.4

[56] References Cited

U.S. PATENT DOCUMENTS 5,375,427 12/1994 Hara et al. .
5,473,906 12/1995 Hara et al. .

*Primary Examiner*—Henry Bennett
*Assistant Examiner*—Marc Norman
*Attorney, Agent, or Firm*—Harness, Dickey & Pierce, PLC

[57] ABSTRACT

A duct for leading air into a vehicle compartment is divided by a partition wall into two air passages. A first air passage is capable of taking in the exterior air while a second passage is capable of taking in only the interior air. In the duct, a cooling heat-exchanger is disposed at a downstream side of a blower unit, and a heating heat-exchanger is disposed at a more downstream side of the cooling heat-exchanger. A defroster air outlet opens at a downstream side of the first air passage, a foot-side air outlet opens at a downstream side of the second air passage, and a face-side air outlet opens between the cooling heat-exchanger and the heating heat-exchanger. A face-side door for opening and closing the face-side air outlet is capable of shutting off the air inlet side of the heating heat-exchanger.

10 Claims, 7 Drawing Sheets

FIG. 3
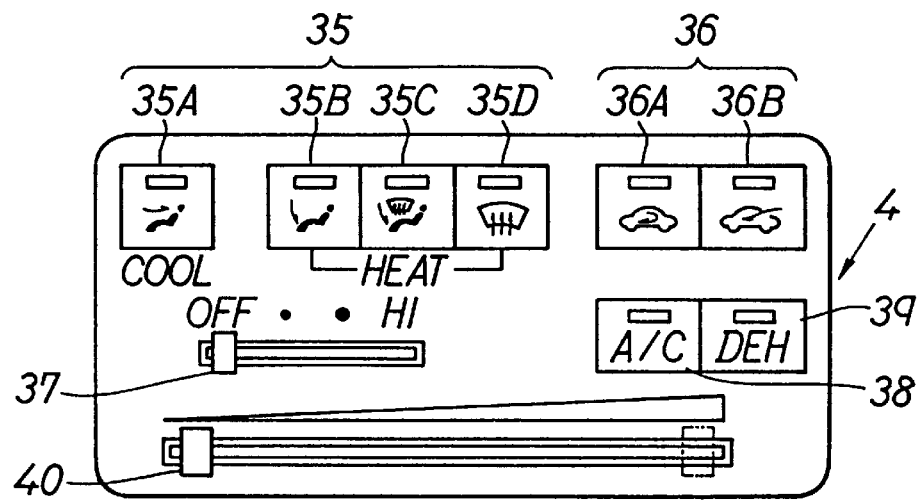
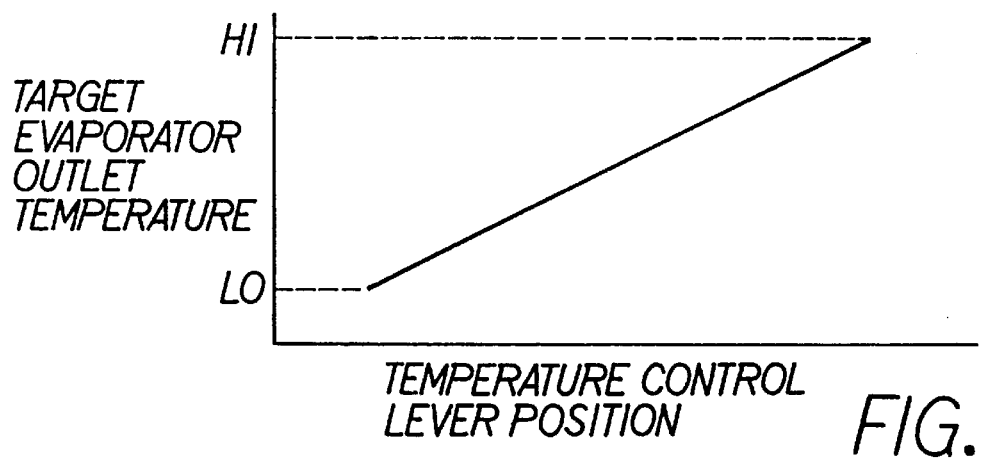
FIG. 3A
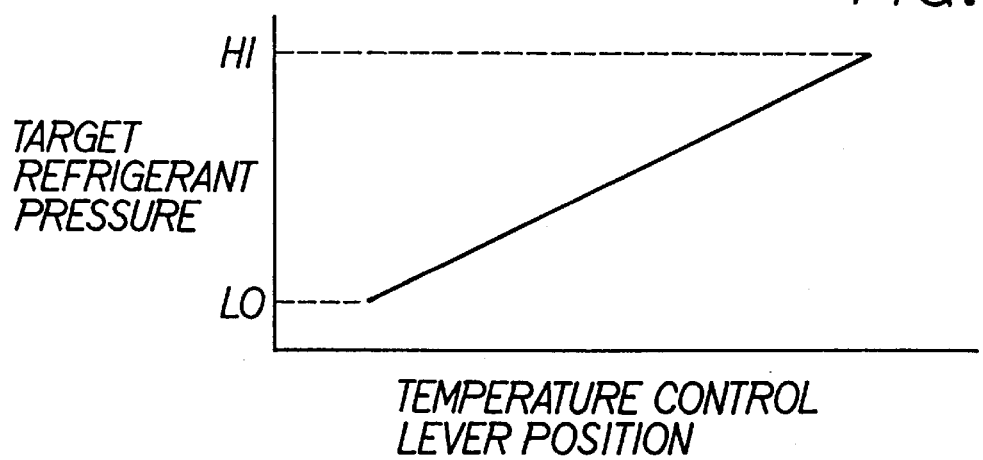
FIG. 3B

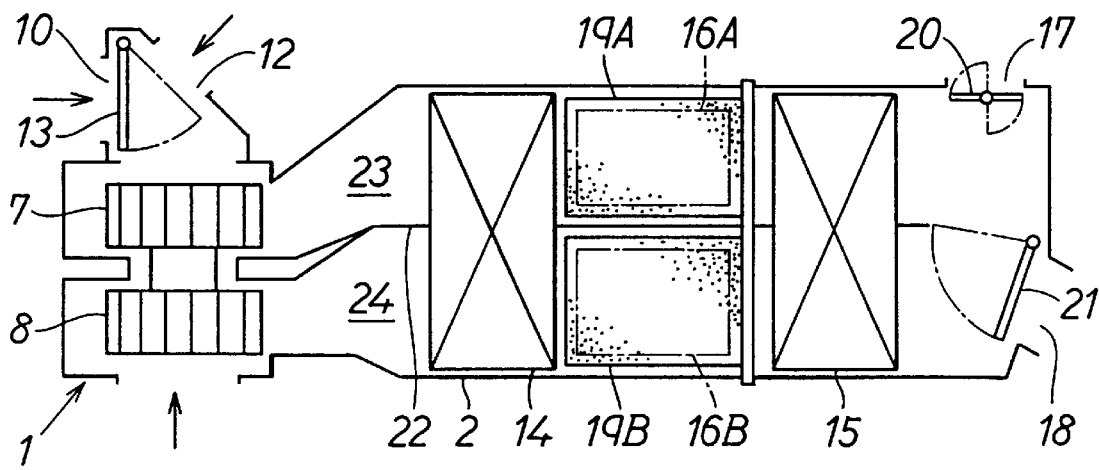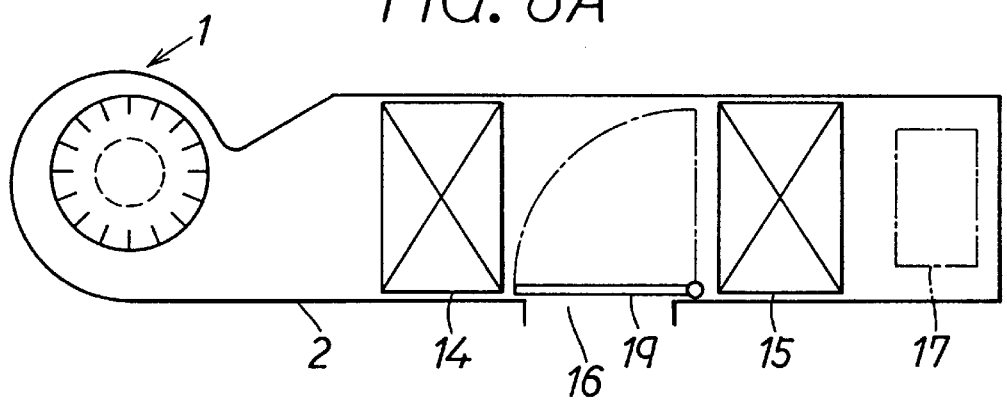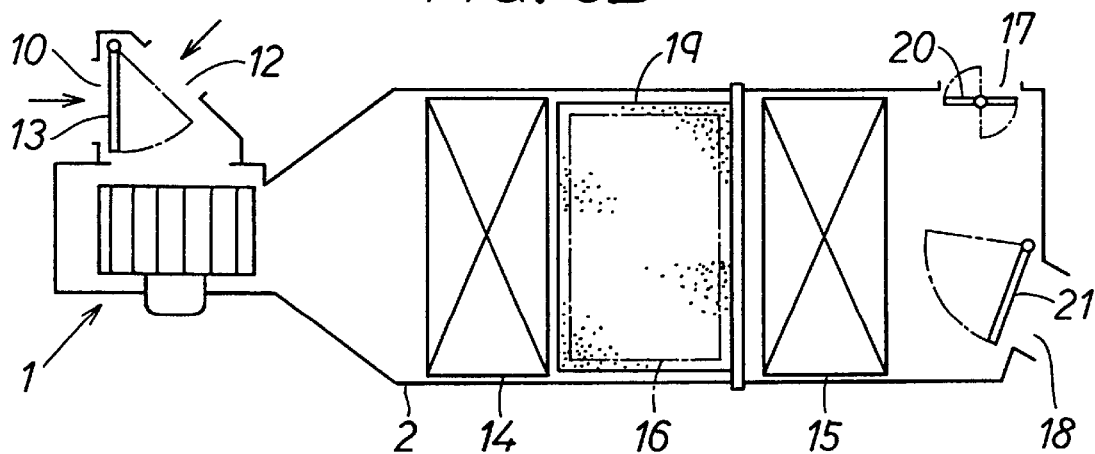

AIR CONDITIONING APPARATUS FOR VEHICLES WITH CONTINUOUS FLOW OF REFRIGERANT

CROSS REFERENCE TO RELATED APPLICATION

This application is related to Japanese patent applications No. 8-206725 filed on Aug. 6, 1996 and No. 9-162200 filed on Jun. 19, 1997 which are incorporated herein by reference.

BACKGROUND OF THE INVENTION

1. Field of the Invention

The present invention relates to an air conditioning apparatus for vehicles which air-conditions a vehicle interior compartment and, more particularly, an air conditioning apparatus for an electrically-powered vehicle having no engine coolant as a heating source.

2. Related Art

Conventionally, as engine coolant cannot be used as a heat source for heating in electrically-powered vehicles having no engines, it is proposed as shown in FIG. 10 to use a refrigerant condenser 100 of a refrigeration cycle as a heat-exchanger for heating (heating heat-exchanger). In this system, the refrigerant flow is changed over by a four-way valve 110 in correspondence with operation modes (cooling, heating dehumidifying and the like). In the cooling operation for instance, as shown by the arrow C in FIG. 10, the refrigerant discharged by the refrigerant compressor 120 flows from the four-way valve 110 through a check valve 130, an exterior heat-exchanger 140, electric-type expansion valve 150, a refrigerant evaporator 160 used as a heat-exchanger for cooling (cooling heat exchanger), accumulator 170 and back to the refrigerant compressor 120. Thus, the air blown off from a blower 180 is cooled by a heat exchange with a low temperature refrigerant flowing through the refrigerant evaporator 160 and is blown off into the vehicle compartment through a selected air outlet (e.g., Face-side air outlet 190). The cool air cooled by the refrigerant evaporator 160 is not heated by the refrigerant condenser 100 at this time, because the refrigerant does not flow through the refrigerant condenser 100.

In the heating operation, as shown by the arrow H in FIG. 10, the refrigerant discharged by the refrigerant compressor 120 flows through the four-way valve 110, the refrigerant condenser 100, an electric-type expansion valve 200, a check valve 210, the exterior heat-exchanger 140, an electromagnetic valve 220, accumulator 170 and back to the refrigerant compressor 120. Thus, the air blown off from the blower 180 is heated by a heat exchange with a high temperature refrigerant flowing through the refrigerant condenser 100 and is blown off into the vehicle compartment through a selected blow-off outlet (e.g., Foot-side air outlet 230). The air blown off by the blower 180 is not cooled by the refrigerant evaporator 160 at this time, because the refrigerant does not flow through the refrigerant evaporator 160.

In the dehumidifying operation, as shown by the arrow D in FIG. 10, the refrigerant discharged by the refrigerant compressor 120 flows through the four-way valve 110, the refrigerant condenser 100, the electric-type expansion valve 200 (fully opened not to work as an expansion valve), the check valve 210, the exterior heat-exchanger 140, the electric-type expansion valve 150, the refrigerant evaporator 160, the accumulator 170 and back to the refrigerant compressor 120. Thus, the air blown off from the blower 180 is cooled (dehumidified) by the refrigerant evaporator 160 and then heated again by the refrigerant condenser 100. The air is blown off into the vehicle compartment through a selected blow-off outlet (e.g., defroster air outlet 240).

In the above heat pump cycle in which the refrigerant flow is changed over in correspondence with the operation modes, as the four-way valve 110 which is expensive is used, the entire cost of the air conditioner becomes high.

The inventors of the present application has considered a refrigeration circuit which eliminates the four-way valve 110 as shown in FIG. 11 to reduce product cost. In this refrigeration circuit, however, as the refrigerant under high temperature and high pressure discharged from the refrigerant compressor 120 continuously through the refrigerant condenser 100, the cold air cooled by the refrigerant evaporator 160 is heated again by the refrigerant condenser 100 and blown off from the Face-side outlet 190 as warm air during cooling operation. For overcoming this problem, it is possible to provide a refrigeration circuit in which the refrigerant discharged from the refrigerant compressor 120 flows bypassing the refrigerant condenser 100 during the cooling operation. However, as not only the refrigeration circuit becomes complicated but also the number of parts such as electromagnetic valves, check valves and the like greatly increases, the merit (cost-down) of eliminating the four-way valve 110 is cancelled.

SUMMARY OF THE INVENTION

It is an object of the present invention to provide an air conditioning apparatus having no four-way valve.

It is another object of the present invention to provide an air conditioning apparatus which is capable of supplying a cool air through a face-side air outlet even under a condition that a refrigerant continuously flows through a refrigerant condenser.

According to one aspect of the present invention, a face-side air outlet is provided at an upstream side of a refrigerant condenser. In this case, even under a condition that a refrigerant flows continuously through the refrigerant condenser, the cold air cooled by a refrigerant evaporator is not heated again by the refrigerant condenser and can be blown off from the face-side air outlet toward the upper body of a passenger.

According to another aspect of the present invention, a duct has a cool air passage which leads the air cooled by a refrigerant evaporator from an upstream side of a refrigerant condenser to a face-side air outlet. Thus, even under the condition that the refrigerant flows through the refrigerant condenser continuously, the air cooled by the refrigerant evaporator is not heated again by the refrigerant condenser. The cool air can be blown off from the face-side air outlet toward the upper body of a passenger through the upstream side of the refrigerant condenser and the cool air passage.

Preferably, an opening/closing door which is capable of closing the air inlet side of the refrigerant condenser under the cooling operation is disposed. The opening/closing door, by closing the air inlet side of the refrigerant condenser, restricts the air cooled by the refrigerant evaporator from flowing into the refrigerant condenser so that the entire cool air may be blown off from the face-side air outlet. Further, even under the condition that the refrigerant continuously flows through the refrigerant condenser, the warm air around the refrigerant condenser can be shut off by the opening/closing door thereby restricting the warm air from mixing with the cool air.

According to a still further object of the present invention, a first air passage capable of taking in exterior air and leading the air passing a refrigerant condenser to a defroster air outlet, and a second air passage capable of taking in interior air and leading the air passing the refrigerant condenser to a foot-side air outlet are disposed. A face-side air outlet opens in at least one of the first air passage and the second air passage at an upstream side of the refrigerant condenser.

In heating operation, the exterior air taken into the first air passage is heated by the refrigerant condenser and blown off from the defroster air outlet to a front windshield glass so that the front windshield glass may be dehumidified, while the interior air taken into the second air passage is heated by the refrigerant condenser and blown off from the foot-side air outlet toward the feet of the passenger so that desired heating effect may be provided. As the interior air taken into the second air passage is higher in temperature than the exterior air, the similar heating effect can be provided by a less heating capability than heating the exterior air.

In cooling operation, on the other hand, as the face-side air outlet opens in at least one of the first air passage and the second air passage at the upstream side of the refrigerant condenser, the cool air can be blown off from the face-side air outlet toward the upper body of the passenger without passing through the refrigerant condenser. As a result, the air flow resistance in the cooling operation can be reduced and the electric power consumption of a blower can be reduced as well.

As the cool air can be blown off from the face-side air outlet without passing through the refrigerant condenser, the refrigerant can be supplied to the refrigerant condenser continuously. That is, the refrigerant which flows through the refrigerant condenser at the time of cooling operation need not be interrupted. Thus, piping paths for the refrigerant can be simplified and the number of the parts can be reduced.

Preferably, opening/closing door is provided to open and close the face-side air outlet and to open and close the first air passage and the second air passage which take in the air to the refrigerant condenser. Thus, the opening/closing means need not be provided separately for each outlet and can reduce the number of parts and the cost.

BRIEF DESCRIPTION OF THE DRAWINGS

Other objects, features and advantages of the present invention will be made more apparent by the following detailed description with reference to the accompanying drawings, in which:

FIG. 3 is a plan view of a control panel in the first embodiment;

FIG. 3A is a graph showing target evaporator outlet temperature versus the temperature control lever position;

FIG. 3B is a graph showing target refrigerant pressure versus the temperature control lever position;

FIG. 7 is a schematic view showing an air flow path in an air conditioning apparatus for vehicles according to a fourth embodiment of the present invention;

FIGS. 8A and 8B are schematic views showing an air flow path in an air conditioning apparatus for vehicles according to a fifth embodiment of the present invention;

DETAILED DESCRIPTION OF THE PREFERRED EMBODIMENT

Figure 1:
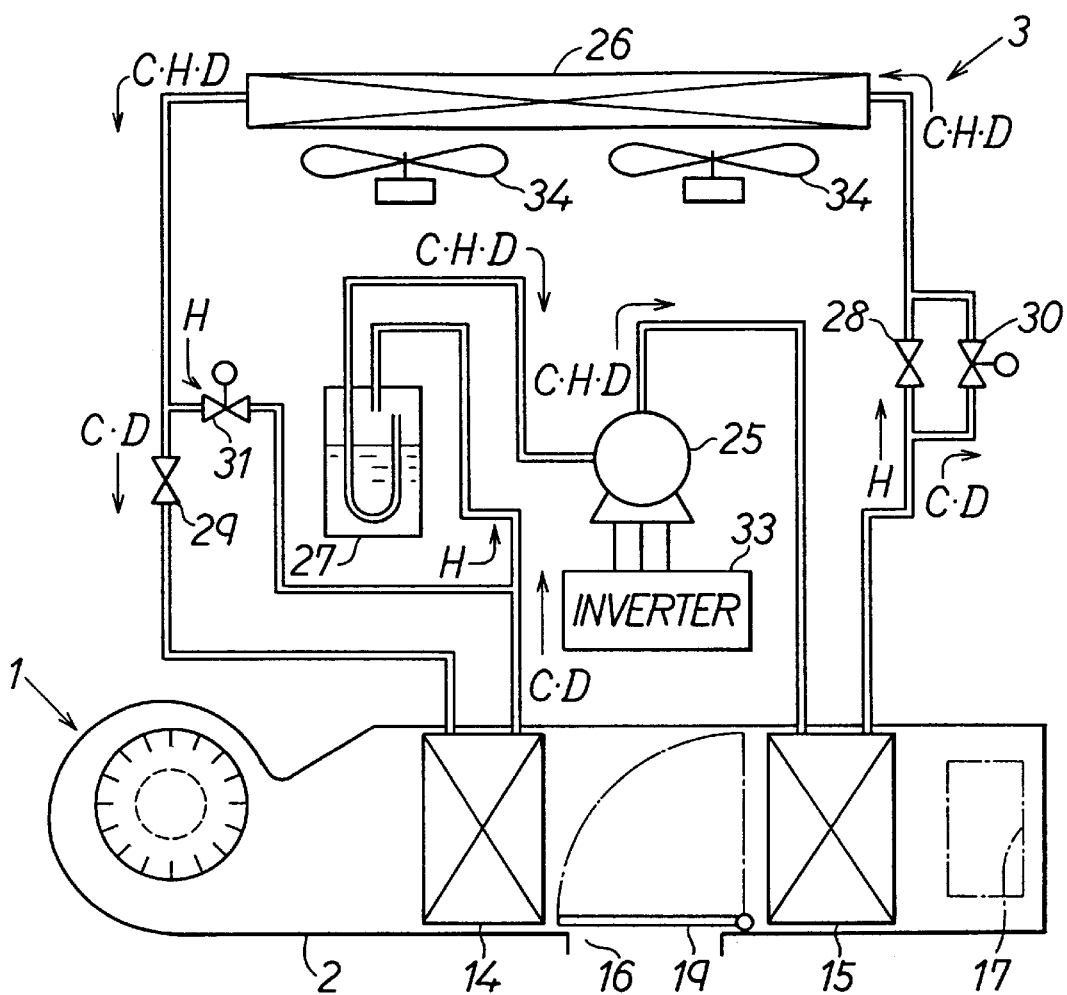
FIG. 1 is an entire structural view of an air conditioning apparatus for vehicles according to a first embodiment of the present invention.

An air conditioning apparatus for a vehicle according to the present invention will be described with reference to the accompanying drawings, throughout which the same or similar reference numerals are used to denote the same or similar components.

(First Embodiment)

An air conditioning apparatus for a vehicle according to the present embodiment is mounted on an electrically-powered vehicle, for instance. As shown in FIG. 1, it is constructed by a blower unit 1 for generating air flow, a duct 2 leading the air supplied from the blower unit 1 into a vehicle compartment, a heat pump type refrigeration cycle 3 for cooling and heating the air flowing through the duct 2, an air conditioner control unit 5 (FIG. 4) for controlling operations of various air conditioning component devices based on various manipulations of an air conditioner control panel 4 (FIG. 3), and the like.

Figure 2:
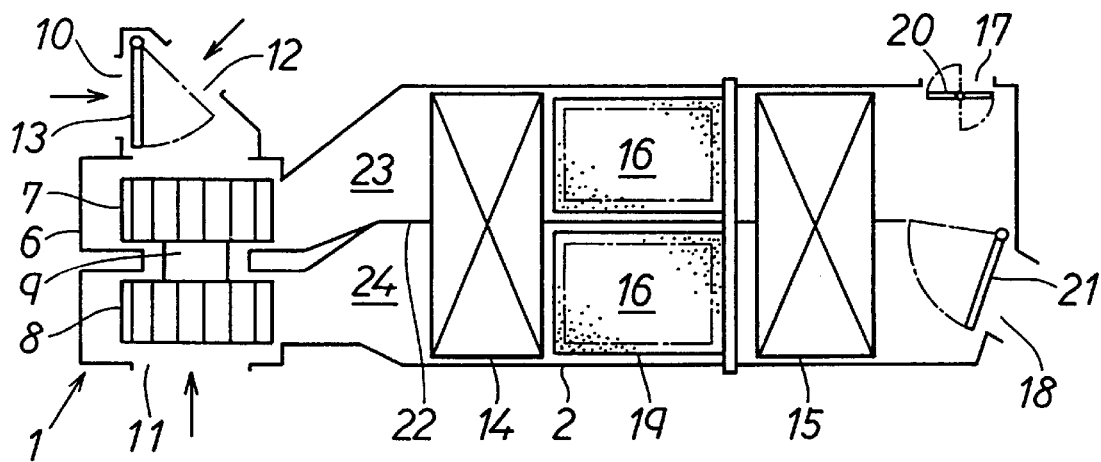
FIG. 2 is a schematic view showing an air flow path in the air conditioning apparatus for vehicles in the first embodiment.

The blower unit 1 is constructed, as shown in FIG. 2, by a blower casing 6, two centrifugal type fans (first fan 7 and second fan 8) housed within the blower casing 6, and a blower motor 9 for rotatively driving the fans 7 and 8.

As air inlets, interior air inlets 10 and 11 for taking in the air from the vehicle compartment (interior air) are provided at two locations, and an exterior air inlet 12 for taking in the air from the vehicle exterior (exterior air) is provide at one location. The interior air inlet 10 and the exterior air inlet 12 are provided in correspondence with the first fan 7 to be opened and closed by an interior/exterior switching door 13 supported rotatively by the blower casing 6. The other interior air inlet 11 is provided in correspondence with the second fan 8 and is kept open.

In the duct 2, a heat-exchanger for cooling (cooling heat-exchanger) 14 is disposed at the downstream side of the blower unit 1, and a heat-exchanger for heating (heating heat-exchanger) 15 is disposed at the more downstream side than the cooling heat-exchanger 14. The cooling heat-exchanger 14 is a refrigerant evaporator of the refrigeration cycle 3 which, during a cooling operation mode and a dehumidifying operation mode, cools the air flowing in the duct 2 (air passing through the cooling heat-exchanger 14) by the heat exchange with the refrigerant flowing in the cooling heat-exchanger 14. The heating heat-exchanger 15 is an interior-side refrigerant condenser of the refrigeration cycle 3 which, during a heating operation mode and a dehumidifying operation mode, heats the air flowing in the duct 2 (air passing through the heating heat-exchanger 15) by the heat exchange with the refrigerant flowing in the heating heat-exchanger 15.

The duct 2 is provided with a face-side air outlet 16 for blowing the air supplied from the blower unit 1 toward the upper body of a passenger, a defroster air outlet 17 for blowing the air toward a front windshield glass, and a foot-side air outlet 18 for blowing the air toward the feet of the passenger. It is also provided with a face-side door 19 for opening and closing the face-side air outlet 16, a defroster door 20 for opening and closing the defroster air outlet 17, and a foot-side door 21 for opening and closing the foot-side air outlet 18. The defroster air outlet 17 and the foot-side air outlet 18 are positioned at the downstream side (FIG. 1), while the face-side air outlet 16 is positioned between the heating heat-exchanger 15 and the cooling heat-exchanger 14 (FIG. 2).

The face-side door 19 operates not only to open and close the face-side air outlet 16 but also to interrupt the air inlet side of the heating heat-exchanger 15. That is, during the face mode operation, the face-side door 19 opens the face-side air outlet 16 (shutting off of the air inlet side of the heating heat-exchanger 15) fully to blow off the air passing through the cooling heat-exchanger 14 from the face-side air outlet 16. During the foot-side mode operation and defroster mode operation, the face-side door 19 opens the air inlet side of the heating heat-exchanger 15 (full closure of the face-side air outlet 16) to introduce the air passing through the cooling heat-exchanger 14 into the heating heat-exchanger 15.

As shown in FIG. 2, the inside of the duct 2 is divided into two, i.e., an upper passage and a lower passage, by a partition wall 22 from the upstream side of the cooling heat-exchanger 14 to the downstream side of the heating heat-exchanger 15. The air blown off by the rotation of first fan 7 flows in the upper passage (first air passage 23), while the air blown off by the rotation of second fan 8 flows in the lower passage (second air passage 24). Each of the cooling heat-exchanger 14 and the heating heat-exchanger 15 are disposed to bridge in both of the first air passage 23 and the second air passage 24. The defroster air outlet 17 opens in the downstream side of the first air passage 23, the foot-side air outlet 18 opens in the downstream side of the second air passage 24, and the face-side air outlet 16 opens in both of the first air passage 23 and the second air passage 24 at a location between the cooling heat-exchanger 14 and the heating heat-exchanger 15.

The foot-side door 21 also function as the partition wall when the foot-side outlet 18 is in the fully opened condition (shown by a dot-chain line in FIG. 2).

The refrigeration cycle 3 is constructed by, as well as the cooling heat-exchanger (refrigerant evaporator) 14 and the heating heat-exchanger (interior condenser) 15, a refrigerant compressor 25, exterior heat-exchanger 26, accumulator 27, pressure reducer 28, 29 and electromagnetic valves 30, 31.

Figure 4:
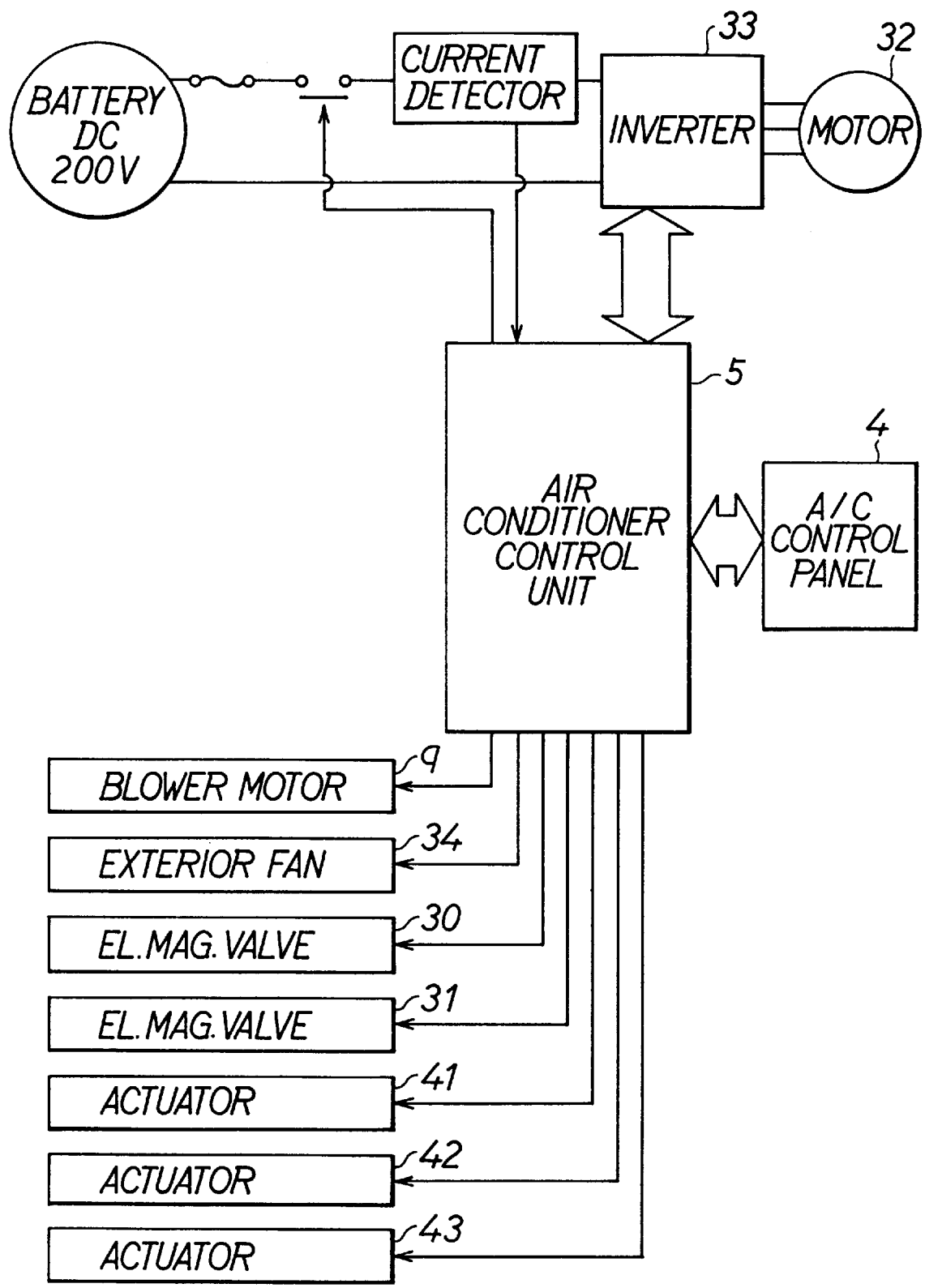
FIG. 4 is a block diagram showing a control system in the first embodiment.

The refrigerant compressor 25 encases an alternating current (a.c.) motor 32 shown in FIG. 4 integrally within a sealed casing to be driven by the A.c. motor 32. The A.c. motor 32 is the type which is controlled by an inverter 33 to vary its rotational speed so that the refrigerant discharge amount of the refrigerant compressor 25 (i.e., rotational speed of the refrigerant compressor 25) is varied in accordance with the rotational speed of the a.c. motor 32.

The exterior heat-exchanger 26 is disposed outside of the vehicle compartment to exchange heat between the refrigerant flowing therein and the exterior air blown off from an electrically-driven exterior fan 34.

The accumulator 27 separates the refrigerant which recirculates into the refrigerant compressor 25 into gas and liquid. It thus stores the liquid refrigerant therein and feeds only the gas-phase refrigerant to the refrigerant compressor 25.

The pressure reducer 28 is disposed in the refrigerant passage between the heating heat-exchanger 15 and the exterior heat-exchanger 26 to reduce in pressure and expand the refrigerant flowing from the heating heat-exchanger 15 to the exterior heat-exchanger 26 during the heating operation, so that the amount of super cool of the heating heat-exchanger 15.

The pressure reducer 29 is disposed in the refrigerant passage between the exterior heat-exchanger 26 and the cooling heat-exchanger 14 to reduce in pressure and expand the refrigerant flowing from the exterior heat-exchanger 26 to the cooling heat-exchanger 14 during the cooling operation, so that the amount of super cool of the exterior heat-exchanger 26.

The electromagnetic valve 30 is disposed in parallel with the pressure reducer 28 between the heating heat-exchanger 15 and the exterior heat-exchanger 26.

The electromagnetic valve 31 is disposed in a bypass passage which, bypassing the pressure reducer 29 and the cooling heat-exchanger 14, connects the upstream side of the pressure reducer 29 and the accumulator 27.

The electromagnetic valves 30 and 31 operates in each operation modes as indicated in the following table.

| MODE | E/M VALVE 30 | E/M VALVE 31 |
| --- | --- | --- |
| COOLING | OPEN | CLOSED |
| HEATING | CLOSED | OPEN |
| DEHUMIDIFYING | OPEN | CLOSED |

The control panel 4 is disposed in the vehicle compartment to be manipulated with ease.

As shown in FIG. 3, the control panel 4 has a blow-off mode change-over switch 35 for setting various blow-off modes, an interior/exterior air change-over switch 36 for switching the interior/exterior air switching door 13, an air flow amount setting switch 37 for setting the air flow amount blown off into the vehicle compartment, a cooling/heating switch 38 for setting a start and a stop of the cooling/heating operation, a dehumidifying switch 39 for setting a start and a stop of dehumidifying operation and a temperature control lever 40 for setting a target temperature of the outlet air.

The blow-off mode change-over switch 35 includes a face-side mode switch 35A for blowing off the air in the duct 2 from the face-side air outlet 16, a foot-side mode switch 35B and a foot-side/defroster mode switch 35C for blowing off the air in the duct 2 from the foot-side air outlet 18 and the defroster air outlet 17, and a defroster mode switch 35 for blowing off the air in the duct 2 from the defroster air outlet 17. The foot-side mode switch 35B and the foot-side/defroster mode switch 35C are for differentiating the amount of air blown off from the defroster air outlet 17 and controls the opening angle of the defroster door 20 so that the air amount is less in the foot-side mode and more in the foot-side/defroster mode.

The interior/exterior air change-over switch 36 includes an interior air mode switch 36A for introducing the interior air into the first air passage 23 in the duct 2, and an exterior mode switch 36B for introducing the exterior air into the first air passage 23.

The air flow amount setting switch 37 is for changing the air flow amount in three levels, for instance, and controls the rotational speed of the blower motor 9 by electric resistances of a resistor (not shown).

The cooling/heating switch 38 is for switching on and off the refrigerant compressor 25 and designed so that the refrigeration cycle 3 performs the cooling operation when both of the cooling/heating switch 38 and the face-side mode switch 35A are turned on with the air flow amount setting switch 37 being turned on, while the refrigeration cycle 3 performs the heating operation when both of the cooling/heating switch 38 and either one of the foot-side mode switch 35B, foot-side/defroster mode switch 35C and the defroster mode switch 35D are turned on.

The dehumidifying switch 39 is so designed that the refrigerant compressor 25 is driven for dehumidifying operation when both of the dehumidifying switch 39 and the defroster mode switch 35D are turned on with the air flow amount setting switch 37 being turned on.

The temperature control lever 40 is for controlling the rotational speed of the refrigerant compressor 25 to vary the temperature of air blown into the vehicle compartment. In this embodiment, the rotational speed of the refrigerant compressor 25 is controlled in the following control process.

A target evaporator blow-off temperature or a target refrigerant pressure is allocated to correspond to the movable range of the temperature control lever 40. During the cooling operation, the temperature of air supplied from the cooling heat-exchanger 14 is set as the target evaporator blow-off temperature. The target temperature is so set to change from low level to high level as the control lever 40 moves from the leftmost position toward the right. The rotational speed of the refrigerant compressor 25 is thus controlled to attain the target temperature. Further, during the heating operation and the dehumidifying operation, the pressure of the refrigerant discharged from the refrigerant compressor 25 is set as the target refrigerant pressure. The pressure is so set to change from low level to high level as the control lever 40 moves from the leftmost position toward the right. The rotational speed of the refrigerant compressor 25 is thus controlled to attain the target pressure.

The air conditioner control unit 5 is an electronic control unit which includes a microcomputer and its associated peripheral circuits, the microcomputer storing therein various calculation equations for an air conditioner control and various control programs. As shown in FIG. 4, the control unit 5 controls on/off operations of various electric components (blower motor 9, inverter 33, exterior electric fan 34, electromagnetic valves 30, 31, actuator 41 for driving interior/exterior change-over door 13, actuator 42 for driving face-side door 19, actuator 43 for driving defroster door 20 and foot-side door 21, and the like).

The operation of the present embodiment is described next.

(Cooling Operation)

When the face-side mode switch 35A, the cooling/heating switch 38 and the air flow amount setting switch 37 on the control panel 4 are turned on by a passenger, the refrigeration cycle 3 performs the cooling operation and the face-side door 19 shuts off the air inlet side of the heating heat-exchanger 15 (i.e., face-side door 16 is opened fully).

In the refrigeration cycle 3, the gaseous refrigerant compressed by the refrigerant compressor 25 into a high temperature and high pressure state flows into the exterior heat-exchanger 26 through the heating heat-exchanger 15 and the electromagnetic valve 30 and condenses and liquifies by exchanging heat with the exterior air blown off from the exterior electric fan 34 at the exterior heat-exchanger 26.

The liquified refrigerant is reduced in pressure by the pressure reducer device 29 and flows into the cooling heat-exchanger 14. When it flows through the cooling heat-exchanger 14, it evaporates by exchanging heat with the air blown off from the blower unit 1. The evaporated gas refrigerant, after flowing into the accumulator 27, is sucked into the refrigerant compressor 25. The refrigerant flow in this cooling operation is shown by an arrow C in FIG. 1.

The air cooled by the cooling heat-exchanger 14 is blown off from the face-side outlet 16 into the vehicle compartment to cool the vehicle compartment. Although the gaseous refrigerant under high temperature and high pressure recirculates through the heating heat-exchanger 15 in this cooling operation mode, the face-side door 19 interrupts the air flow passage to the heating heat-exchanger 15 and the cool air is blown off from the face-side air outlet 16 opening at the upstream side of the heating heat-exchanger 15. Thus, the warm air around the heating heat-exchanger 15 will not mix with the cool air.

(Heating Operation)

When both of the cooling/heating switch 38 and either one of the foot-side mode switch 35B, the foot-side/defroster mode switch 35C and the defroster mode switch 35D as well as the air flow amount setting switch 37 on the control panel 4 are turned on by a passenger, the refrigeration cycle 3 performs the heating operation and the face-side door 19 closes the face-side air outlet 16 (i.e., opens the air inlet side of the heating heat-exchanger 15).

In the refrigeration cycle 3, the gaseous refrigerant compressed by the refrigerant compressor 25 into a high temperature and high pressure state flows into the heating heat-exchanger 15 and condenses and liquifies by exchanging heat with the air passing through the heating heat-exchanger 15. The liquified refrigerant is reduced in pressure by the pressure reducer device 28 and flows into the exterior heat-exchanger 26. It evaporates by exchanging heat with the air blown off from the exterior electric fan 34 in the exterior heat-exchanger 26. The evaporated gas refrigerant, after flowing into the accumulator 27 through the electromagnetic valve 31, is sucked into the refrigerant compressor 25. The refrigerant flow in this heating operation is shown by an arrow H in FIG. 1.

The air heated by the heating heat-exchanger 15 is blown off from the foot-side outlet 18 or the defroster air outlet 17 into the vehicle compartment to heat the vehicle compartment.

It is to be noted that, when the exterior air mode switch 36B is selected in the foot-side mode and foot-side/defroster mode, fresh exterior air is introduced from the exterior air inlet 12 into the first air passage 23 in the duct 2. This air is blown off from the defroster air outlet 17 toward the front windshield glass after passing through the cooling heat-exchanger 14 and being heated by the heating heat-exchanger 15. In the mean time, the interior air is introduced from the interior air inlet 11 into the second air passage 24 in the duct 2. This air is blown off from the foot-side air outlet 18 toward the feet of the passenger after passing through the cooling heat-exchanger 14 and being heated by the heating heat-exchanger 15.

(Dehumidifying Operation)

When the defroster mode switch 35D and the dehumidifying switch 39 as well as the air flow amount setting switch 37 on the control panel 4 are turned on by a passenger, the refrigeration cycle 3 performs the dehumidifying operation and the face-side door 19 closes the face-side air outlet 16 (i.e., opens the air inlet side of the heating heat-exchanger 15).

In the refrigeration cycle 3, the gaseous refrigerant compressed by the refrigerant compressor 25 into a high temperature and high pressure state flows into the heating heat-exchanger 15 and condenses by exchanging heat with the air passing through the heating heat-exchanger 15. The refrigerant flowing out from the heating heat-exchanger 15 flows into the exterior heat-exchanger 26 through the electromagnetic valve 30 and liquifies by exchanging heat with the exterior air blown off from the exterior electric fan 34 in the exterior heat-exchanger 26. The liquified refrigerant is reduced in pressure by the pressure reducer device 29 and flows into the cooling heat-exchanger 14. Flowing through the cooling heat-exchanger 14, the refrigerant evaporates by exchanging heat with the air blown off from the blower unit 1. The gaseous refrigerant thus evaporated is sucked into the refrigerant compressor 25 after flowing into the accumulator 27. The refrigerant flow in this dehumidifying operation is shown by an arrow D in FIG. 1.

The air flowing in the duct 2 is heated again by the heating heat-exchanger 15 after being cooled and dehumidified by the cooling heat-exchanger 14. Thus, warm air with low humidity is blown off from the defroster air outlet 17 to restrict clouding on the front windshield glass.

According to this embodiment, as the face-side air outlet 16 is disposed between the cooling heat-exchanger 14 and the heating heat-exchanger 15, the air inlet side of the heating heat-exchanger 15 can be shut off at the time of cooling operation by the face-side door 19 which opens and closes the face-side air outlet 16. Thus, the air cooled by the cooling heat-exchanger 14 at the time of cooling operation can be blown off from the face-side air outlet 16 into the vehicle compartment without passing the heating heat-exchanger 15. As a result, as the air flow resistance in the duct 2 can be reduced greatly at the time of face-side operation mode, the electric power consumption of the blower unit 1 which requires a large amount of air flow for the cooling operation.

Further, as the air inlet side of the heating heat-exchanger 15 can be shut off at the time of the cooling operation by the face-side door 19, the refrigerant flowing through the heating heat-exchanger 15 need not be shut off. That is, even in the case that the refrigerant under high temperature and high pressure recirculates through the heating heat-exchanger 15 at the time of cooling operation, the warm air heated by the heating heat-exchanger 15 will not flow from the face-side air outlet 16 into the vehicle compartment and hence cooling will not be deteriorated. For this reason, no refrigerant switching means such as a four-way valve is necessitated and the number of components can be reduced with the simplification of a piping path which the refrigerant flows. Further, as the face-side door 19 is used for both opening and closing the face-side air outlet and opening and closing the air passage of the heating heat-exchanger 15, no opening/closing means is necessitated separately for opening and closing the air passage of the heating heat-exchanger 15. This reduction in the number of components results in cost reduction.

Further, the air conditioning apparatus according to this embodiment has the first air passage 23 capable of taking in the exterior air into the duct 2 and the second air passage 24 taking in only the interior air, so that the air flowing in the first air passage 23 is blown off mainly from the defroster air outlet 17 and the air flowing in the second air passage 24 is blown off mainly from the foot-side air outlet 18. As a result, at the time of heating operation, the vehicle compartment interior air having a relatively high temperature is sucked into the second air passage 24 and heated by the heating heat-exchanger 15 so that it may be blown off from the foot-side air outlet 18 toward the feet of the passenger. This reduces the heating load. In addition, the vehicle compartment exterior air having a relatively low humidity is sucked into the first air passage 23 and heated so that it may be blown off from the defroster air outlet 17 toward the front windshield glass to reduce the clouding on the front windshield glass.

(Second Embodiment)

Figure 5A:
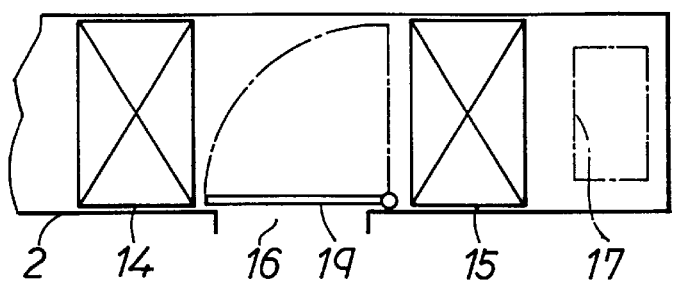
FIGS. 5A and 5B are schematic views showing an air flow path in an air conditioning apparatus for vehicles according to a second embodiment of the present invention.
Figure 5B:
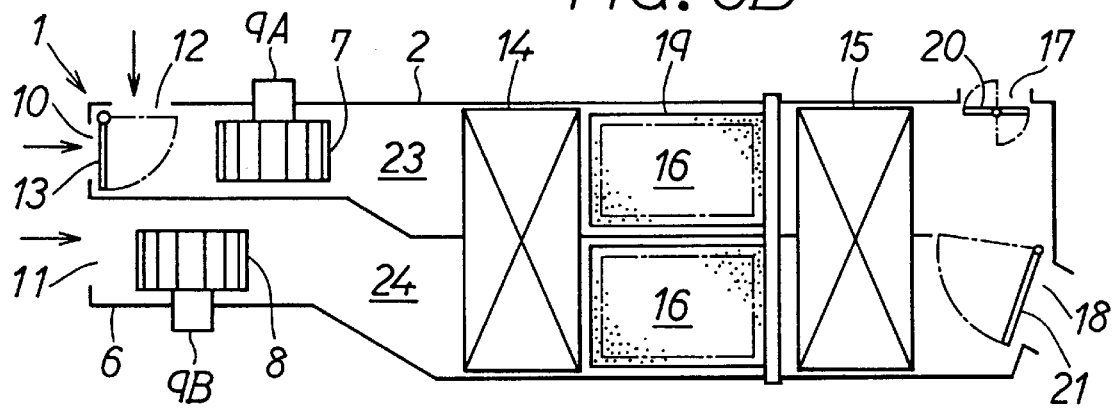

In this embodiment, as shown in FIGS. 5A and 5B, the first fan 7 and the second fan 8 are driven by separate blower motors 9A and 9B, respectively.

(Third Embodiment)

Figure 6A:
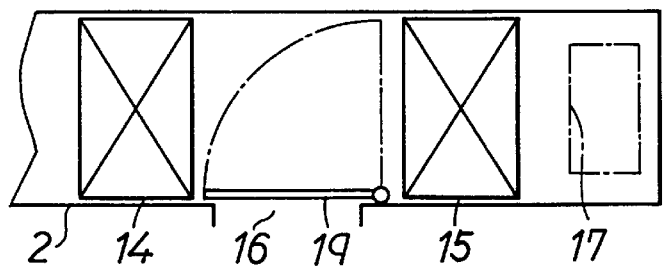
FIGS. 6A and 6B are schematic views showing an air flow path in an air conditioning apparatus for vehicles according to a third embodiment of the present invention.
Figure 6B:
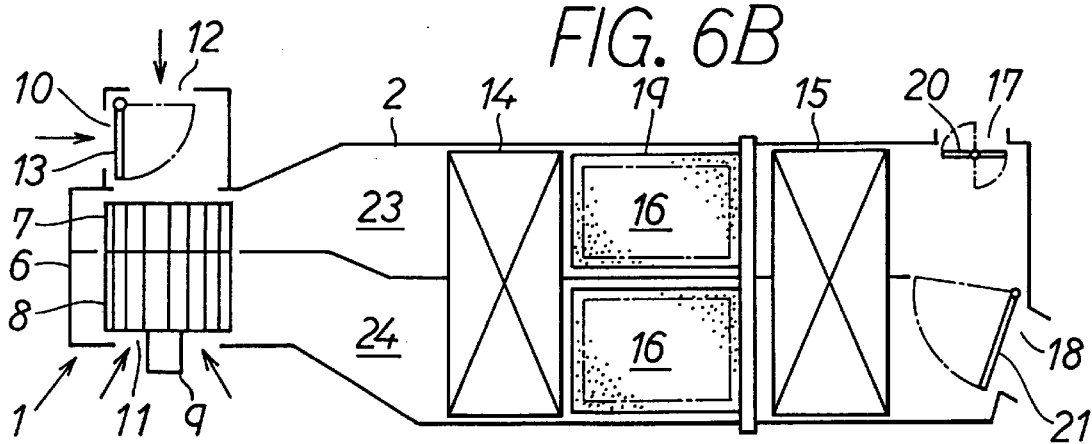

In this embodiment, as shown in FIGS. 6A and 6B, the first fan 7 and the second fan 8 are integrated to be driven by the single blower motor 9.

It is to be noted that, although the face-side air outlet 16 is provided for each of the first and the second air passages 23 and 24 in the above embodiments, it may be provided for only one of the air passages.

(Fourth Embodiment)

In this embodiment, as shown in FIG. 7, a face-side door 19A for opening and closing a face-side air outlet 16A opening in the first air passage 23 and a face-side door 19B for opening and closing a face-side air outlet 16 opening in the second air passage 24 are provided to be driven separately from each other so that a bi-level operation mode may be selected.

In the bi-level operation mode, the air-conditioned air can be blown off from both of the face-side air outlet 16A and the foot-side air outlet 18 by controlling the face-side door 19A to a position for fully opening the face-side air outlet 16A and by controlling the face-side door 19B to a position for fully closing the face-side air outlet 16B.

(Fifth Embodiment)

In this embodiment, as shown in FIGS. 8A and 8B, the duct 2 is constructed as a single passage unit without dividing it into two passages. In this case, in the same manner as in the foregoing embodiments, the face-side air outlet 16 opens between the cooling heat-exchanger 14 and the heating heat-exchanger 15 so that the face-side door 19 for opening and closing the face-side air outlet 16 is capable of shutting off the air inlet side of the heating heat-exchanger 15.

Thus, as the face-side door 19 fully opens the faceside air outlet 16 at the time of cooling operation to shut off the air inlet side of the heating heat-exchanger 15 even when the refrigerant continues to flow in the cooling heat-exchanger, the cool air cooled by the cooling heat-exchanger 14 can be blown off from the face-side air outlet 16 toward the upper body of the passenger. Further, as the face-side door 19 shuts off the air flow path to the heating heat-exchanger 15 and the cool air flows out from the face-side air outlet 16 opening at the upstream side of the heating heat-exchanger 15, the warm air around the heating heat-exchanger 15 will not mix with the cool air.

(Sixth Embodiment)

Figure 9:
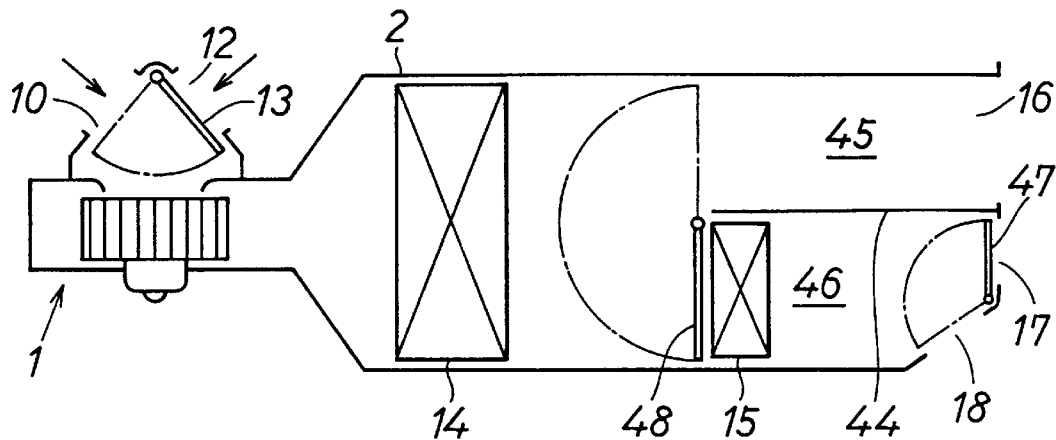
FIG. 9 is a schematic view showing an air flow path in the air conditioning apparatus for vehicles according to a sixth embodiment of the present invention.
Figure 10:
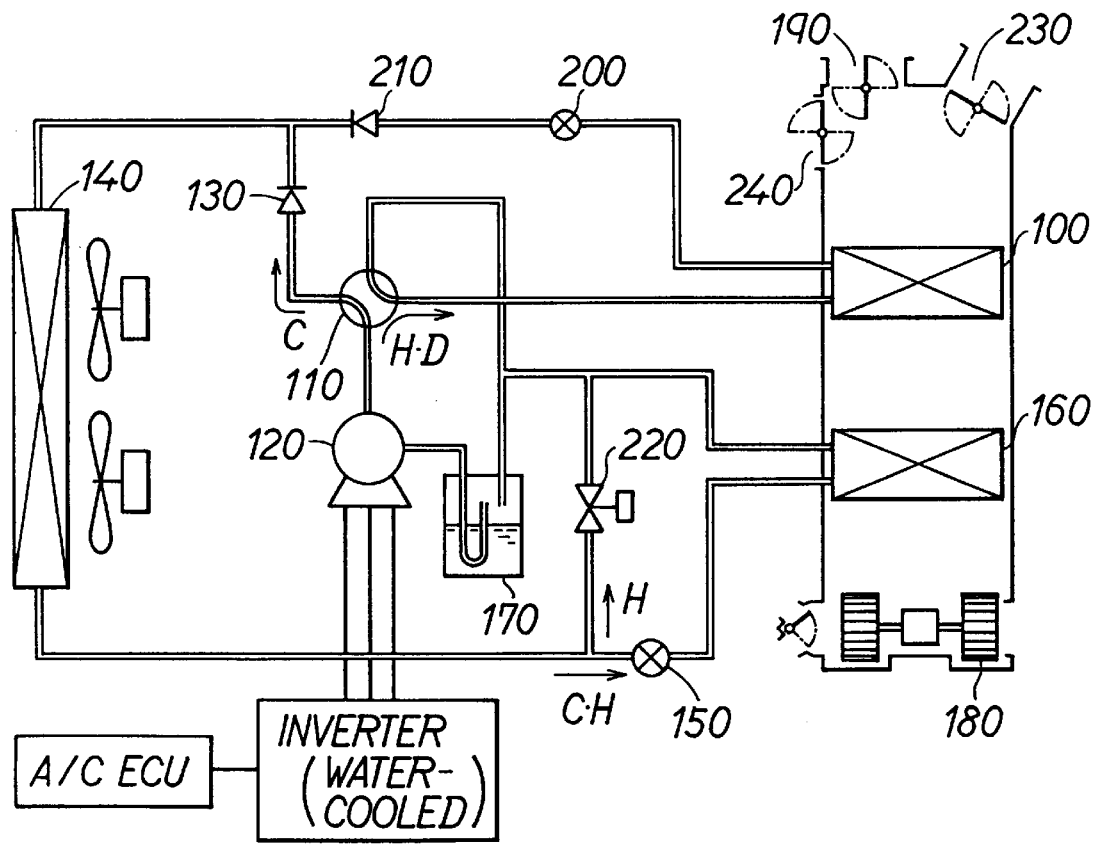
FIG. 10 is a schematic view of an air conditioning apparatus to which a prior art refrigeration cycle using a four-way valve is applied.
Figure 11:
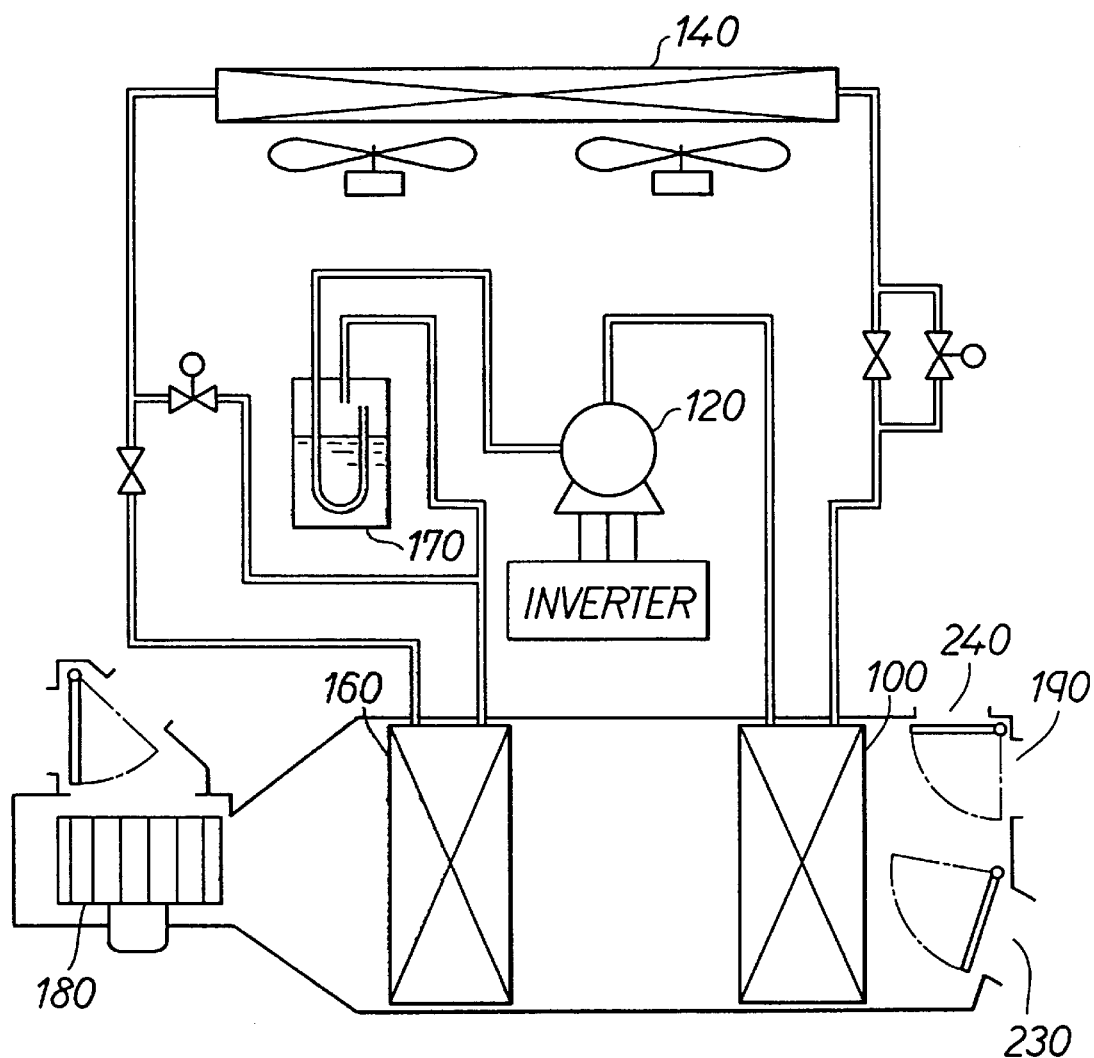
FIG. 11 is a schematic view of an air conditioning apparatus to which a refrigeration cycle using no four-way valve is applied.

In this embodiment, as shown in FIG. 9, the duct 2 is divided into two passages by a partition wall 44 from the heating heat-exchanger 15 to the downmost end so that a cool air passage 45 and a warm air passage 46 are provided. The cool air passage 45 is for leading the cool air from the upstream side of the heating heat-exchanger 15 bypassing the heating heat-exchanger 15. The face-side air outlet 16 is provided at its downmost end. The warm air passage 46 is for leading the air heated by the heating heat-exchanger 15. The defroster air outlet 17 and the foot-side air outlet 18 are provided at its downmost end to be opened and closed selectively by an air outlet switching door 47. Further, a cool air door 48 capable of opening and closing the cool air passage 45 and shutting off the air inlet side of the heating heat-exchanger 15 is provided in the duct 2.

According to this construction, by controlling the cool air door 48 to a position for shutting off the air inlet side of the heating heat-exchanger 15 (position shown by a solid line in FIG. 9), the cool air cooled by the cooling heat-exchanger 14 can be supplied to the face-side air outlet 16 through the cool air passage 45 without passing through the heating heat-exchanger 15. As a result, even when the refrigerant continues to flow in the heating heat-exchanger 15, the cool air can be blown off from the face-side air outlet 16. Further, as the air inlet side of the heating heat-exchanger 15 is shut off by the cool air door 48, the warm air around the heating heat-exchanger 15 will not admix with the cool air.

What is claimed is:

1. An air conditioner for vehicles comprising:

a duct having a face-side air outlet for blowing off air toward an upper body of a passenger;

a refrigeration cycle having a refrigerant evaporator disposed in the duct for cooling the air by heat exchange with a low temperature refrigerant flowing therein, and a refrigerant condenser disposed in the duct at a downstream side of the refrigerant evaporator for heating the air by heat exchange with a high temperature refrigerant flowing therein; and an opening/closing door disposed in the duct for fully opening the face-side air outlet and fully closing an inlet side of the refrigerant condenser during a cooling operation;

wherein the refrigeration cycle is constructed to flow the refrigerant continuously to the refrigerant condenser, the face-side air outlet is disposed at an upstream side of the refrigerant condenser, and the air cooled by the refrigerant evaporator is blown off only from the face-side air outlet before being heated by the refrigerant condenser.

2. An air conditioner for vehicles comprising:

a duct having a face-side outlet for blowing off air toward an upper body of a passenger;

a refrigeration cycle having a refrigerant evaporator disposed in the duct for cooling the air by heat exchange with a low temperature refrigerant flowing therein, and a refrigerant condenser disposed in the duct at a downstream side of the refrigerant evaporator for heating the air by heat exchange with a high temperature refrigerant flowing therein; and an opening/closing door disposed in the duct for fully opening the face-side air outlet and fully closing an inlet side of the refrigerant condenser during a cooling operation;

wherein the refrigeration cycle is constructed to flow the refrigerant continuously to the refrigerant condenser, the duct has a cool air passage leading the air cooled by the refrigerant evaporator to the face-side air outlet from an upstream side of the refrigerant condenser, and the air cooled by the refrigerant evaporator is blown only from the face-side air outlet before being heated by the refrigerant condenser.

3. An air conditioner for vehicles comprising:

a duct having a face-side air outlet for blowing off air toward an upper body of a passenger, a defroster air outlet for blowing off the air toward a front windshield glass, and a foot-side air outlet for blowing off the air toward feet of the passenger; and a refrigeration cycle having a refrigerant evaporator disposed in the duct for cooling the air by heat exchange with a low temperature refrigerant flowing therein, and a refrigerant condenser disposed in the duct at a downstream side of the refrigerant evaporator for heating the air by heat exchange with a high temperature refrigerant flowing therein, wherein the refrigeration cycle is constructed to flow the refrigerant continuously to the refrigerant condenser, the duct has a first air passage capable of taking in exterior air and leading the air passing the refrigerant condenser to the defroster air outlet and a second air passage capable of taking in interior air and leading the air passing the refrigerant condenser to the foot-side air outlet, the face-side air outlet opens in at least one of the first air passage and the second air passage at an upstream side of the refrigerant condenser, the air cooled by the refrigerant evaporator is blown off only from the face-side air outlet before heated by the refrigerant condenser, and the air heated by the refrigerant condenser is blown off only from the defroster air outlet and the foot-side air outlet.

4. The air conditioner for vehicles according to claim 3, further comprising:

opening/closing means for opening and closing the face-side air outlet and for opening and closing the first air passage and the second air passage which take in air to the refrigerant condenser.

5. An air conditioner for vehicles comprising:

a duct having a face-side air outlet for blowing off air toward an upper body of a passenger;

a refrigeration cycle having a refrigerant evaporator disposed in the duct for cooling the air by heat exchange with a low temperature refrigerant flowing therein, and a refrigerant condenser disposed in the duct at a downstream side of the refrigerant evaporator for heating the air by heat exchange with a high temperature refrigerant flowing therein; and an opening/closing door disposed in the duct for fully closing the face-side air outlet and fully opening an air inlet side of the refrigerant condenser during a heating operation;

wherein the refrigeration cycle is constructed to flow the refrigerant continuously to the refrigerant condenser, the face-side air outlet is disposed at an upstream side of the refrigerant condenser, and the air cooled by the refrigerant evaporator is blown off only from the face-side air outlet before being heated by the refrigerant condenser.

6. An air conditioner for vehicles comprising:

a duct having a face-side outlet for blowing off air toward an upper body of a passenger;

a refrigeration cycle having a refrigerant evaporator disposed in the duct for cooling the air by heat exchange with a low temperature refrigerant flowing therein, and a refrigerant condenser disposed in the duct at a downstream side of the refrigerant evaporator for heating the air by heat exchange with a high temperature refrigerant flowing therein; and an opening/closing door disposed in the duct for fully closing the face-side outlet and fully opening an air inlet side of the refrigerant condenser during a heating operation, wherein the refrigeration cycle is constructed to flow the refrigerant continuously to the refrigerant condenser, the duct has a cool air passage leading the air cooled by the refrigerant evaporator to the face-side air outlet from an upstream side of the refrigerant condenser, and the air cooled by the refrigerant evaporator is blown off only from the face-side air outlet before being heated by the refrigerant condenser.

7. The air conditioner for vehicles according to claim 5 wherein, the duct has a partition wall therein which divides the duct into the first air passage and the second air passage.

8. An air conditioner for electrically-powered vehicles comprising:

a duct having a first air outlet for blowing off air toward a first direction in a vehicle compartment, and a second air outlet for blowing off the air toward a second direction in the vehicle compartment;

a refrigeration cycle having a cooling heat exchanger disposed in the duct for cooling the air passing therethrough, a heating heat exchanger disposed in the duct at a downstream side of the cooling heat exchanger for heating the air passing therethrough, an electrically driven compressor, and a refrigerant circulation path for circulating a refrigerant through the compressor, the heating heat exchanger and the cooling heat exchanger continuously;

a door disposed movable in the duct between the cooling heat exchanger and the heating heat exchanger for changing a flow direction of the air cooled by the cooling heat exchanger; and a control unit for controlling the door in accordance with air conditioning modes, the control unit controlling the door during a cooling mode to a position for directing the air cooled by the cooling heat exchanger toward the first air outlet and restricting the air cooled by the cooling heat exchanger from flowing toward the heating heat exchanger, wherein:

the first air outlet is a face-side air outlet;

the second air outlet is a defroster air outlet and a foot-side air outlet;

the duct has a partition defining a first passage and a second passage in the duct, the first passage being led to the defroster air outlet and the second passage being led to the foot-side air outlet, and the first passage and the second passage being led to the face-side air outlet; and the cooling heat exchanger and the heating heat exchanger are disposed to bridge the first passage and the second passage.

9. The air conditioner for electrically-powered vehicles according to claim 8 wherein, the door is disposed commonly to the first passage and the second passage to direct fully the air cooled by the cooling heat exchanger in the first passage and the second passage to the face-side air outlet during the cooling mode.

10. The air conditioner for electrically-powered vehicles according to claim 8 wherein, the door includes a first door part and a second door part which are disposed in the first passage and the second passage respectively so that the air cooled by the cooling heat exchanger in the first passage and the second passage is directed differently.

* * * * *